US012691855B2

(12) United States Patent
Buchanan

(10) Patent No.: US 12,691,855 B2
(45) Date of Patent: Jul. 28, 2026

(54) TRAILER PANIC BRAKING ASSIST

(71) Applicant: Lippert Components, Inc., Mishawaka, IN (US)

(72) Inventor: Adam Buchanan, South Lyon, MI (US)

(73) Assignee: Lippert Components, Inc., Mishawaka, IN (US)

( * ) Notice: Subject to any disclaimer, the term of this patent is extended or adjusted under 35 U.S.C. 154(b) by 0 days.

(21) Appl. No.: 18/761,430

(22) Filed: Jul. 2, 2024

(65) Prior Publication Data

US 2025/0010824 A1     Jan. 9, 2025

Related U.S. Application Data

(60) Provisional application No. 63/524,833, filed on Jul. 3, 2023.

(51) Int. Cl.

| | |
|---|---|
| *B60T 8/17* | (2006.01) |
| *B60T 7/20* | (2006.01) |
| *B60T 8/171* | (2006.01) |
| *B60T 8/172* | (2006.01) |
| *B60T 8/1761* | (2006.01) |
| *B60T 8/58* | (2006.01) |
| *B60T 17/22* | (2006.01) |

(52) U.S. Cl.
CPC .............. *B60T 8/1701* (2013.01); *B60T 7/20* (2013.01); *B60T 8/171* (2013.01); *B60T 8/172* (2013.01); *B60T 8/17616* (2013.01); *B60T 8/58* (2013.01); *B60T 17/22* (2013.01); *B60T 2201/03* (2013.01); *B60T 2220/04* (2013.01);

*B60T 2240/00* (2013.01); *B60T 2250/00* (2013.01); *B60T 2250/04* (2013.01)

(58) Field of Classification Search
CPC ........ B60T 8/1701; B60T 8/171; B60T 8/172; B60T 8/17616; B60T 8/58; B60T 8/1708; B60T 8/323; B60T 7/20; B60T 17/22; B60T 2201/03; B60T 2220/04; B60T 2250/00; B60T 2250/04; B60T 2240/00
USPC ........................................................ 701/70
See application file for complete search history.

(56) References Cited

U.S. PATENT DOCUMENTS

| | | | |
|---|---|---|---|
| 3,668,629 A | 6/1972 | Pawl | |
| 4,232,910 A | 11/1980 | Snyder | |
| 6,623,090 B2 | 9/2003 | Ullmann et al. | |
| 7,204,564 B2 | 4/2007 | Brown et al. | |
| 9,016,807 B1 | 4/2015 | Pieronek et al. | |
| 9,156,460 B2 | 10/2015 | Clark et al. | |
| 9,168,901 B2 | 10/2015 | Funder et al. | |
| 9,550,481 B2 | 1/2017 | Tu et al. | |
| 10,272,890 B2 | 4/2019 | Carritte et al. | |
| 10,549,732 B2 * | 2/2020 | Kasper ............... | B60T 8/17616 |
| 10,759,401 B1 | 9/2020 | Hensley | |

(Continued)

FOREIGN PATENT DOCUMENTS

| | | |
|---|---|---|
| DE | 4129878 A1 | 3/1992 |
| DE | 19524939 A1 | 1/1997 |

(Continued)

*Primary Examiner* — Hai H Huynh
(74) *Attorney, Agent, or Firm* — Mechanicus PLLC

(57) ABSTRACT

A method and device for improving trailer brake response during a hard braking event by identifying unnecessary attenuation of a trailer braking signal, and responding by boosting the trailer braking signal.

19 Claims, 3 Drawing Sheets

(56)         References Cited

U.S. PATENT DOCUMENTS

| | | | |
|---|---|---|---|
| 10,807,580 B2 | 10/2020 | Hunt et al. | |
| 10,814,853 B2 | 10/2020 | Ganzel | |
| 10,836,366 B2 | 11/2020 | James et al. | |
| 10,894,534 B2 | 1/2021 | Hiller | |
| 11,142,178 B2 | 10/2021 | Ganzel et al. | |
| 11,440,516 B2 | 9/2022 | Kulkarni et al. | |
| 11,932,225 B1 * | 3/2024 | Kirmaier | B60T 8/323 |
| 2002/0093245 A1 | 7/2002 | Claerhout | |
| 2008/0143179 A1 | 6/2008 | Rutherford | |
| 2020/0001841 A1 * | 1/2020 | Green | B62D 53/005 |
| 2021/0061244 A1 | 3/2021 | Heseding et al. | |
| 2022/0097786 A1 | 3/2022 | Heseding et al. | |
| 2022/0118961 A1 | 4/2022 | Brinkman et al. | |

FOREIGN PATENT DOCUMENTS

| | | | |
|---|---|---|---|
| EP | 2998174 B1 | 6/2019 | |
| GB | 2322918 A | 9/1998 | |
| KR | 101281999 B1 | 7/2013 | |

* cited by examiner

TRAILER PANIC BRAKING ASSIST

CROSS-REFERENCES TO RELATED APPLICATIONS

This application claims the benefit of the filing date of U.S. Provisional Patent Application Ser. No. 63/524,833 filed Jul. 3, 2023, the entirety of which is incorporated herein by reference.

BACKGROUND

Field

This application relates generally to trailer brake control systems.

Description of Related Art Including Information Disclosed Under 37 CFR 1.97 and 1.98

Some vehicles configured for towing trailers include a trailer brake controller that receives braking commands from a driver of the vehicle, and relays those commands by sending signals to brakes of a towed trailer. Some of these brake controllers limit the amount of braking force relayed from driver to trailer brakes, often by setting an upper limit to the gain of signals sent to the trailer brakes. While limited controllers like this can help prevent loss of traction by trailers that lack anti-lock brakes, they also unnecessarily reduce the available braking capacity of trailers that do have anti-lock brakes, and can cause instability when a towing vehicle begins applying sufficient braking force in excess of the braking force applied by the trailer it is towing. Modem trailers may have their own brake control modules that provide sophisticated anti-lock and stability features; however, these brake control modules are still limited to receiving the unnecessarily-limited signals of the trailer brake controller in the towing vehicle. Freeing up this unused braking potential could improve the odds of averting damage or injury in critical or emergency situations that require the driver to apply panic braking.

SUMMARY

A trailer brake assist device for improving trailer brake response during a hard braking event comprises a trailer brake signal input, a motion sensor signal input, an attenuation detector, a brake booster, and a trailer brake signal output. The trailer brake signal input is configured to receive trailer brake control signals from a trailer brake controller. The motion sensor signal input is configured to receive trailer motion signals from at least one motion sensor positioned to detect motion of at least part of a trailer. The trailer brake signal output is configured to send trailer brake signals to trailer brakes of the trailer. The attenuation detector is configured to detect when trailer brake signals received by the braking signal input have been attenuated by the trailer brake controller. And the brake booster is configured to increase the braking commanded by brake signals sent from the brake signal output, relative to signals received by the brake signal input, in response to detection of attenuation by the attenuation detector.

A method for improving trailer brake response during a hard braking event comprises the steps of: monitoring trailer brake control signals sent by a trailer brake controller in response to tow vehicle operator inputs; detecting trailer brake controller attenuation of the trailer brake control signals; and responding to the detected attenuation of the trailer brake control signals by sending modified and/or substitute trailer brake control signals commanding brakes of a trailer to apply greater braking force than that being commanded by the trailer brake control signals sent by the trailer brake controller.

DRAWING DESCRIPTIONS

These and other features and advantages will become apparent to those skilled in the art in connection with the following detailed description and drawings of one or more embodiments of the invention, in which:

FIG. 1 is a schematic diagram of an embodiment of a trailer brake assist device, showing it in relation to other systems that it may interact with;

DETAILED DESCRIPTION

A method for improving trailer brake response during a hard braking event, and a trailer brake boost device for applying the method are described below.

Figure 1:
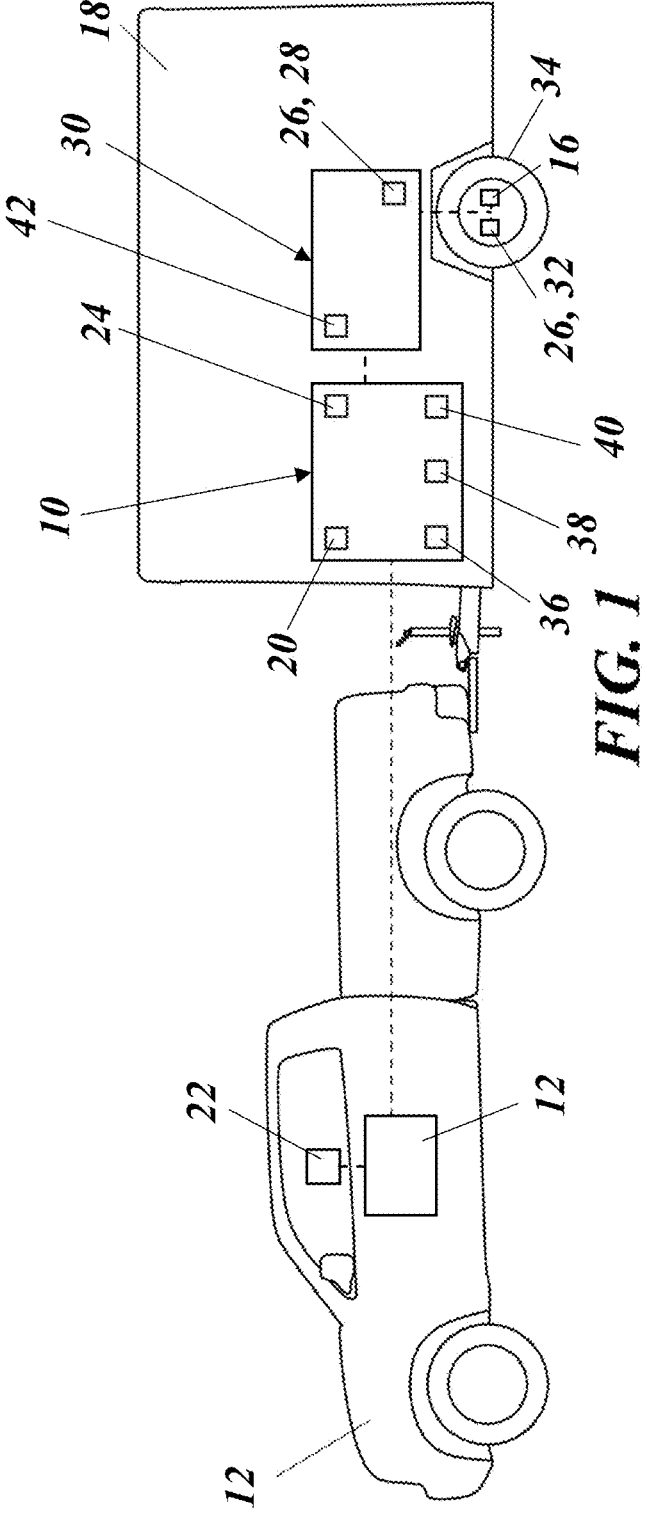

The trailer brake assist device, shown at 10 in the diagram of FIG. 1, may comprise embodiments including, but not limited to, an independent controller component, a feature built into an anti-lock brake control module of a trailer, or a modified version of an existing anti-lock brake control module that has been upgraded/retrofitted. From a perspective of signal flow, it may be connected between a point where a towing vehicle 12 issues trailer brake signals (such as from the tow vehicle's trailer brake controller 14), and a point where trailer brake control signals are received by brakes 16 of a trailer 18 being towed by the towing vehicle 12.

From this position, the trailer brake assist device 10 may monitor incoming trailer brake signals via a trailer brake signal input 20 that receives trailer brake control signals from the towing vehicle's trailer brake controller 14, the tow vehicle's trailer brake controller 14 being whatever system architecture that the tow vehicle 12 uses to receive, interpret, and relay brake inputs from a tow vehicle operator 22 (whether from a software, hardware, or human driver) to the trailer 18.

The trailer brake assist device 10 may also monitor motion data via a motion sensor signal input 24 that receives trailer motion signals from at least one motion sensor 26 positioned to detect motion of at least part of the trailer 18. This motion sensor signal input 24 may be connected to multiple such sensors 26 if different types. For example, the motion sensor signal input 24 may be connected to receive motion data from trailer-mounted accelerometers such as an inertial measurement unit 28 of an anti-lock braking system 30, and/or wheel speed sensors 32 of the anti-lock brake system 30 that monitor the speed of each wheel 34 of the trailer 18.

The trailer brake assist device 10 may also comprise a trailer brake signal output 36 that enables the device 10 to send secondary trailer brake signals to the trailer's brakes 16. In practice, and depending on the embodiment, these secondary brake signals may modify and/or be sent to the trailer's brakes 16 instead-of the "primary" brake signals sent by the towing vehicle 12. In the former case, the original primary signals may be passed along to the brakes after having been altered by addition of the secondary brake signals. In the latter case, none of the signals sent by the towing vehicle 12 would actually reach the trailer brakes 16, although the substituted secondary brake signals may often be accurate replications of the primary signal.

Figure 3:
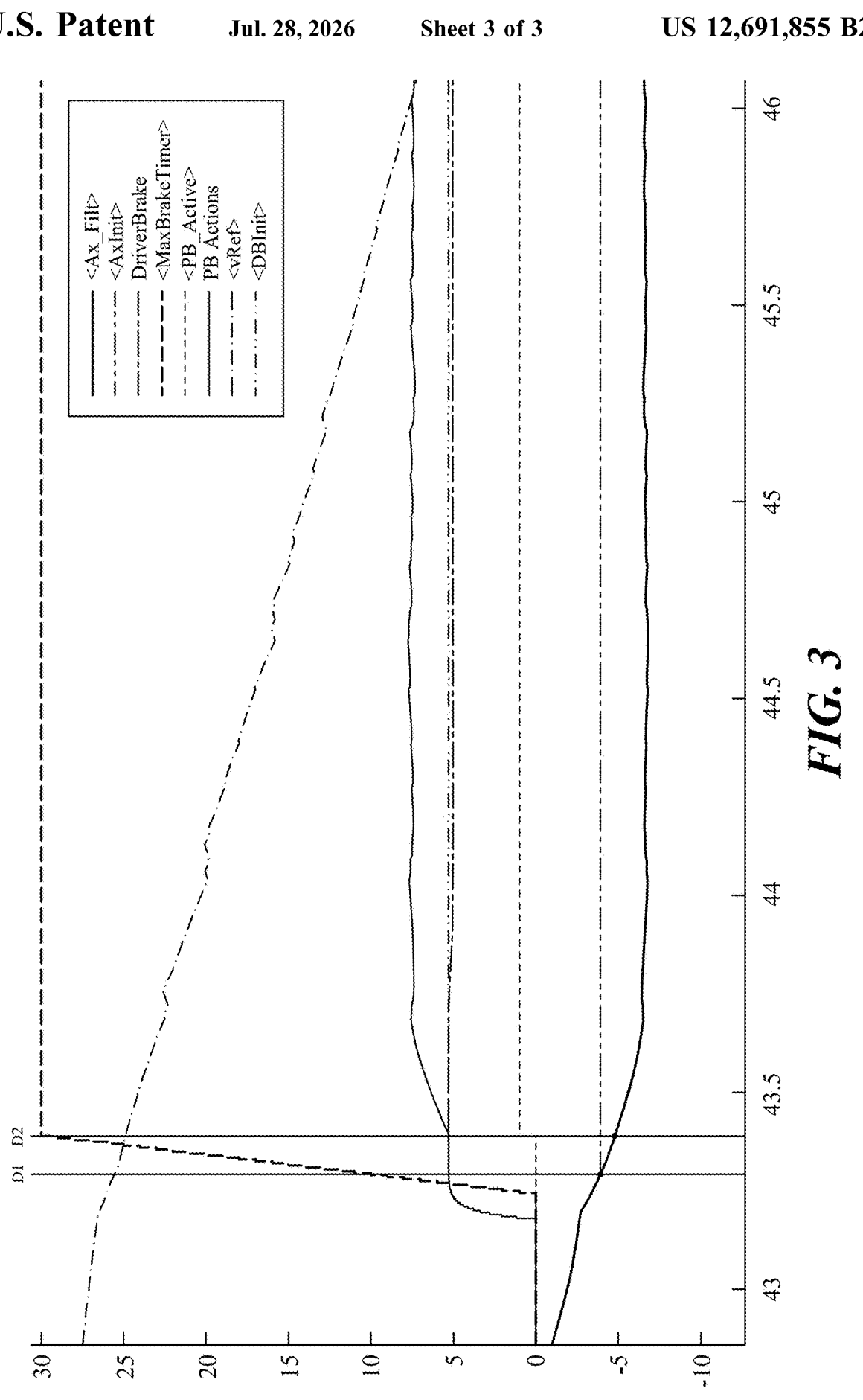
FIG. 3 is a chart showing signals generated or received by components of the device, and points where decisive criteria are satisfied according to its method of operation.

To analyze the incoming data, the device 10 may comprise an attenuation detector 38 that detects, based on one or more of the monitored signals, whether trailer brake signals from the tow vehicle 12 are being attenuated. The device 10 may also include a first order filter through which the incoming signals may pass before being analyzed. Once the attenuation detector 38 determines that the trailer brake signals are being attenuated, the device 10 may respond by activating a brake booster 40 that increases the braking commanded by brake signals sent from the brake signal output 36, relative to signals received by the brake signal input 20. For example, the device 10 may be preconfigured to increase brake signal output relative to input when the attenuation detector 38 detects that a brake force control parameter of the trailer brake control signals has remained steady within a predetermined range for a predetermined minimum period of time. In FIG. 3, this parameter is shown as an expression of a PWM signal in voltage, however, any parameter corresponding to the level of force that the signals are meant to command the trailer brakes 16 to apply may be used here. Multiple parameters may also be used. For example, the device 10 may activate the brake booster 40 if it determines that brake signals from the tow vehicle 12 have plateaued in requested braking force during a time in which the motion sensors 26 indicate that the tow vehicle 12 and/or trailer 18 have increased in deceleration.

In addition to determining that attenuation has occurred, the device 10 may be configured to further require other non-attenuation-related conditions (such as a minimum wheel speed) to be satisfied by signals received by the motion sensor signal input 24 before activating the brake booster 40. Further details and examples of how attenuation may be detected, and under what conditions the device 10 may execute and terminate boosting of the brakes 16, are presented later.

To increase the voltage of trailer brake signals sent from the device's trailer brake signal output 36, relative to trailer brake signals received at the trailer brake signal input 20, the brake booster 40 may be connected to and draw power from a power supply 42, such as a power supply of the trailer's antilock braking system.

In practice, the device 10 may be employed to practice a method for improving trailer brake 16 response during a hard braking event. The method may essentially comprise the steps of monitoring trailer brake control signals sent by a trailer brake controller 14 in response to tow vehicle operator inputs, detecting that the trailer brake controller 14 is attenuating the trailer brake control signals, and responding to the detected attenuation of the trailer brake control signals by sending modified and/or substitute trailer brake control signals commanding brakes 16 of a trailer 18 to apply greater braking force than that being commanded by the trailer brake control signals sent by the trailer brake controller 14.

In a preferred embodiment, the method may be more elaborate, adding one or more extra steps or sub-steps. For example, criteria may be added to prevent, or cease, boosting brake output in response to false positive detections of brake signal attenuation. According to such a preferred embodiment, the method may be executed by performing the method described above, along with one or more of the steps added in the examples below (main steps shown in bold).

Monitor a brake force control parameter (such as voltage) of the trailer brake control signals. Examples of this are shown by the tow vehicle pulse width modulation (tPWM) signal line shown in FIG. 2, and the Driver Brake line shown in FIG. 3.

Monitor parameters sensed by one or more of the motion sensors 26, such as trailer wheel speed, longitudinal acceleration, and/or speed of the trailer 18 or tow vehicle 12. This is shown by the trailer longitudinal acceleration (Ax or Ax_Filt) lines in FIGS. 2 and 3, and reference speed (vRef) shown in FIG. 3, which may be calculated from wheel speed sensors 32.

Detect whether the trailer brake controller 14 is attenuating the trailer brake control signals during a hard braking event. This may require one or more of the following determinations to be made before a boosting response is permitted:

The voltage of trailer brake control signals received from a trailer brake controller 14 must remain steady within a predetermined voltage range for a predetermined minimum period of time. For example, as best shown in FIG. 3, voltage of the received trailer brake signal (DriverBrake) may be sampled every 5 milliseconds, and a timer (MaxBrakeTimer) may increase a count for every sample in which the DriverBrake voltage remains within 0.05V of the last sample. MaxBrakeTimer may be required to reach a count of at least 10 (50 msec remaining within 0.05V), the point where this criteria is met in this embodiment is shown by vertical line D1 of FIG. 3, which represents the initial point where Attenuation is detected. In this example of FIG. 3, the detector 38 is configured to record the initial levels of Ax_Filt and Driverbrake at D1 as AxInit and DBInit, respectively, for later use.

Once AxInit and DBInit are set, the embodiment of FIG. 3 requires Maxbrake timer to increase by another 20 counts (another 100 msec remaining within 0.05V) as a precondition to boosting the brake signal. In FIG. 3, the required count is met at vertical line D2.

The voltage of the received trailer brake signals must remain above a minimum threshold value (DriverBrake of FIG. 3 must remain above 0.1V, for example). This prevents a false positive from being generated by a minimum resting voltage in the received brake control signals).

The speed of the trailer 18 (or some corollary thereof, such as vRef in FIG. 3) must be above a minimum value. For example, vRef of FIG. 3 may be required to remain greater than 4 m/s. This should prevent a brake boosting response when the vehicle 12 is stopped, or nearly stopped. In these situations, emergency braking is unlikely to be helpful.

To determine whether this attenuation has occurred during a hard braking event, a monitored motion parameter may be required to exceed a predetermined threshold value during at least part of the predetermined minimum period of time. This may also be determined via the motion sensors 26. For example, in the embodiment of FIG. 3, acceleration of the trailer 18 must be determined to have changed by at least 0.9 m/s² relative to an acceleration reading taken when the timer count was at 10. In other words, the difference between Ax and AxInit in this embodiment must reach at least 0.9 m/s².

The trailer's anti-lock braking system 30 may be required to not be reporting any faults, or at least must report no faults predetermined to be hazardous to boosting the trailer brake signals. Alternatively, where the anti-lock braking system 30 (or any other system that monitors the trailer) reports a fault relating to a particular trailer wheel 34 or its brake 16, both wheels 34 on that axle may be locked out from receiving any boosted trailer braking signals, in order to prevent possible asymmetric braking.

Once the trailer brake controller 14 is detected to be attenuating the trailer brake control signals during a hard braking event, respond by boosting outgoing trailer brake signals by sending modified and/or substitute trailer brake control signals commanding brakes 16 of a trailer 18 to apply greater braking force than that being commanded by the trailer brake control signals sent by the trailer brake controller 14. This is shown by the resulting system pulse width modulation signal (sPWM) line of the FIG. 2 embodiment, and by the PB Actions line of the FIG. 3 embodiment. Activation of boosting is shown by the binary 1 or 0 value of PB_Active in FIGS. 2 and 3. This activation point is also marked by vertical line D2 in FIG. 3.

The amount by which braking force is commanded to increase, during boosting of the modified and/or substitute trailer brake control signals, may correspond to a change in the monitored parameter of motion. For example, a gradient of increased force commanded by brake control signals from the trailer brake controller 14 prior to attenuation may be determined. This gradient may be multiplied by the difference between the latest sample of acceleration (Ax in FIG. 3), and an acceleration reading sampled at the time the responding step began boosting outgoing brake control signals (Ax reads about −5 at D2 in FIG. 3). The product of this multiplication is then added to the force requested by the incoming brake control signals to produce the outgoing boosted brake control signals. In other embodiments, the strength of the outgoing braking signals (sPWM or PBActions) may follow a pre-determined profile, or it may be set relative to other criteria, such as a compromise between incoming signals and available battery voltage.

Figure 2:
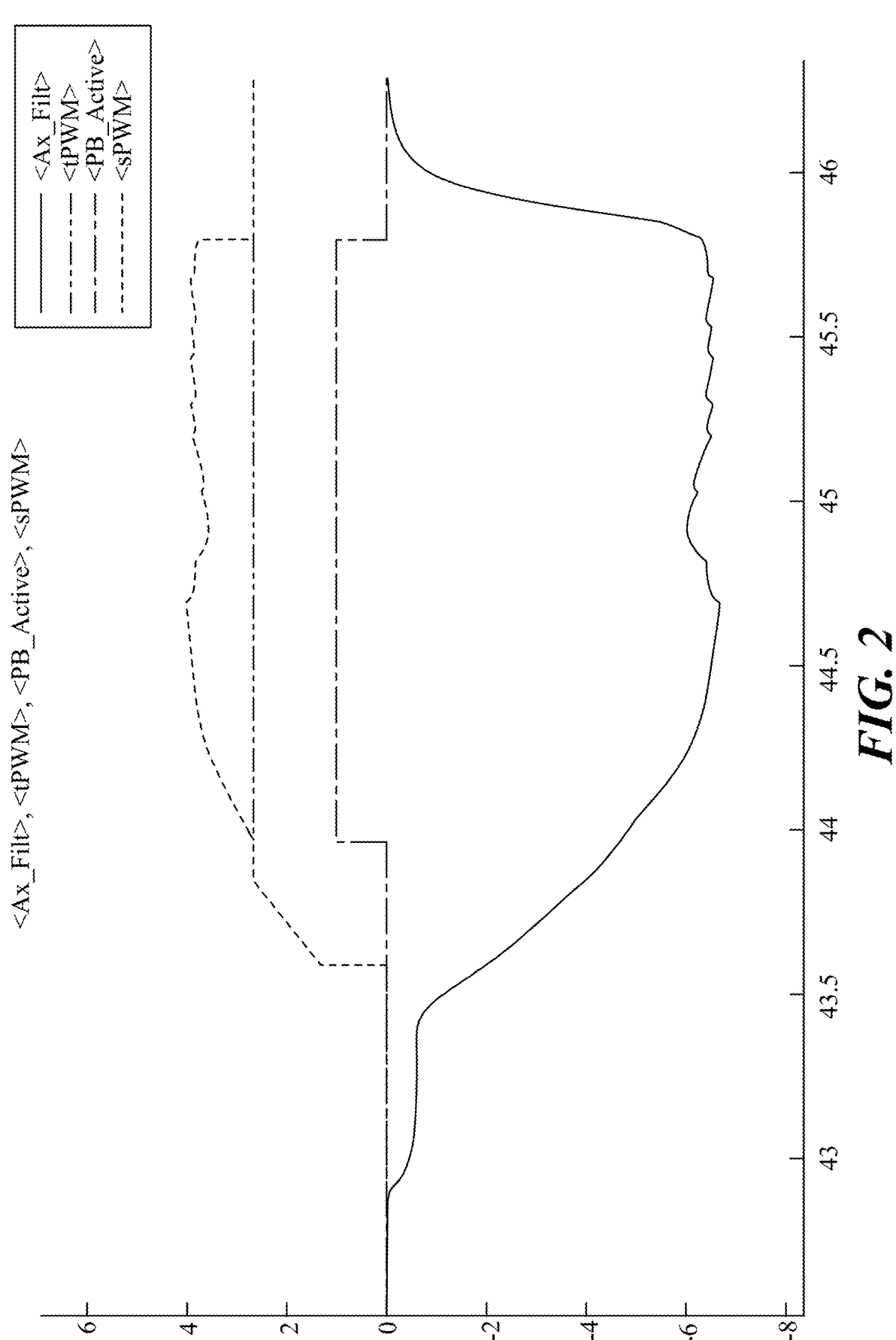
FIG. 2 is a chart showing signals generated or received by components of the device according to its method of operation.

Cease boosting of brake control signals in response to one or more of the following disengagement criteria:

speed sensed by a speed sensor 26 falls below a predetermined minimum value (an example of the results of this criterion is shown in FIG. 2, where tPWM commands from the Tow Vehicle never decrease, but PB_Active returns to zero just before Ax_Filt acceleration returns to zero, indicating that the vehicle and trailer have halted);

trailer brake control signals sent by the trailer brake controller 14 fall below a predetermined minimum voltage value for a predetermined period of time (indicating that the operator 22 has reduced requested braking);

trailer brake control signals sent by the trailer brake controller 14 fall below a minimum voltage value, and acceleration increases by a minimum value relative to the acceleration value at the time that the detecting step was completed; and/or trailer brake control signals sent by the trailer brake controller 14 rise by more than a predetermined maximum value of change in voltage relative to the voltage value of the received trailer brake control signals at the time that the detecting step was completed (this identifies a false-positive attenuation determination that should not have been responded-to).

A trailer brake assist device performing a method such as described above allows the trailer, during an emergency or other hard braking event, to apply braking force higher than that commanded by brake control signals that it receives from a tow vehicle. The device and method enable the detection of, and compensation for attenuation of a driver's brake command by a common trailer brake controller. This can help decrease stopping distance and improve stability when both are critically necessary. The device and method may be enabled in common trailer anti-lock braking systems via relatively easy updates or upgrades, because most, or all, of the necessary components should already be in place. The anti-lock braking functions may be left essentially unchanged, and can maintain stability and traction during brake boosting just as they do during normal braking.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A method for improving trailer brake response during a hard braking event, the method comprising the steps of:

monitoring primary trailer brake control signals sent by a trailer brake controller in response to tow vehicle operator inputs;

detecting trailer brake controller attenuation of the trailer brake control signals; and responding to the detected attenuation of the trailer brake control signals by sending secondary trailer brake control signals commanding brakes of a trailer to apply greater braking force than that being commanded by the primary trailer brake control signals.

2. The method of claim 1 in which:

the monitoring step includes monitoring a brake force control parameter of the primary trailer brake control signals; and the detecting step includes a determination that the monitored brake force control parameter of the primary trailer brake control signals has remained steady within a predetermined range for a predetermined minimum period of time.

3. The method of claim 2 in which:

the monitored brake force control parameter comprises electrical voltage of the primary trailer brake control signals; and the detecting step includes a determination that the voltage of the primary trailer brake control signals has remained steady within a predetermined voltage range for the predetermined minimum period of time.

4. The method of claim 3 in which:

the detecting step also includes determining that the voltage of the primary trailer brake signals is above a minimum threshold value; and execution of the responding step is further conditioned upon a determination that the voltage of the primary trailer brake signal is above the minimum threshold.

5. The method of claim 1 in which:

claim 1 includes the additional step of monitoring a parameter of motion sensed by a motion sensor that senses motion of at least a portion of at least one of the trailer and the tow vehicle; and execution of the responding step is further conditioned upon the monitored parameter exceeding a predetermined threshold value during a period of time before which attenuation of primary trailer brake control signals has been detected.

6. The method of claim 5 in which the monitored parameter of motion is acceleration.

7. The method of claim 5 in which the responding step additionally comprises increasing braking force of the secondary trailer brake control signals by an amount corresponding to a change in the monitored parameter of motion.

8. The method of claim 1 in which:
claim 1 includes the additional step of monitoring a speed of at least a portion of at least one of the trailer and the tow vehicle;
the detecting step also includes a determination that the speed is above a minimum threshold value; and
the responding step is further conditioned upon the determination that the speed is above a minimum threshold value.

9. The method of claim 8 in which:
the monitoring step includes monitoring signals that are generated by and received from a speed sensor, and that correspond to the speed of at least a portion of at least one of the trailer and tow vehicle; and
the speed sensor comprises wheel speed sensors positioned so that the rotational speed of each wheel of the trailer is monitored by a wheel speed sensor.

10. The method of claim 9 in which the speed determined in the detecting step is the speed of the trailer calculated based on the rotational speed of the trailer wheels.

11. The method of claim 1 including the additional step of ceasing to send secondary trailer brake signals that differ from the primary trailer brake control signals, in response to at least one disengagement criterion selected from the group of criteria consisting of:
speed sensed by a speed sensor falls below a predetermined minimum value;
primary trailer brake control signals received from the trailer brake controller fall below a predetermined minimum voltage value for a predetermined period of time;
primary trailer brake control signals received from the trailer brake controller fall below a minimum voltage value, and acceleration increases by a minimum value relative to the acceleration value at the time that the detecting step was completed; or
primary trailer brake control signals received from the trailer brake controller rise by more than a predetermined maximum value of change in voltage relative to the voltage value of the primary trailer brake control signals at the time that the detecting step was completed.

12. The device of claim 1 in which the motion sensor comprises one or more wheel speed sensors positioned to sense the speed of wheels of the trailer.

13. The device of claim 1 in which the motion sensor comprises an accelerometer mounted to the trailer and sensing accelerations of the trailer.

14. The device of claim 1 in which the motion sensor signal input is connected to receive signals from motion sensors including both accelerometer and wheel speed sensors mounted to the trailer.

15. The device of claim 1 in which the brake booster comprises a power supply, and the brake booster is connected to and draws power from the power supply to increase the voltage of braking commands received by the trailer brakes relative to the primary trailer brake control signals received by the brake signal input.

16. A trailer brake assist device for improving trailer brake response during a hard braking event, the device comprising:
a trailer brake signal input connected to receive primary trailer brake control signals from a trailer brake controller;
a motion sensor signal input connected to receive trailer motion signals from at least one motion sensor positioned to detect motion of at least part of a trailer;
a trailer brake signal output connected to send secondary trailer brake signals to trailer brakes of the trailer;
an attenuation detector preconfigured to detect when primary trailer brake signals received by the trailer brake signal input have been attenuated by the trailer brake controller; and
a brake booster preconfigured to increase the braking commands received by the trailer brakes relative to the primary trailer brake control signals received by the brake signal input by sending secondary brake signals from the brake signal output, in response to detection of attenuation by the attenuation detector.

17. The device of claim 16 in which:
the device is a component of a trailer antilock brake system;
the motion sensor signal input is connected to and receives signals from an inertial measurement unit of the antilock brake control system;
the motion sensor signal input is connected to and receives signals from wheel speed sensors of the antilock brake control system; and
the brake booster is a component of a controller of the trailer antilock brake system.

18. The device of claim 16 in which the brake booster is preconfigured to increase the braking commands received by the trailer brakes relative to the primary trailer brake control signals received by the brake signal input by sending secondary brake signals from the brake signal output in response to both detection of attenuation by the moderation detection feature, and in response to signals received by the motion sensor signal input.

19. The device of claim 18 in which the brake booster is preconfigured to increase the braking commands received by the trailer brakes relative to the primary trailer brake control signals received by the brake signal input by sending secondary brake signals from the brake signal output when the attenuation detector detects that a brake force control parameter of the trailer brake control signals has remained steady within a predetermined range for a predetermined minimum period of time.

* * * * *